(12) United States Patent
Wells et al.

(10) Patent No.: US 10,423,791 B2
(45) Date of Patent: Sep. 24, 2019

(54) ENABLING OFFLINE RESTART OF SHIELDED VIRTUAL MACHINES USING KEY CACHING

(71) Applicant: Microsoft Technology Licensing, LLC, Redmond, WA (US)

(72) Inventors: Dean Anthony Wells, Snohomish, WA (US); Nir Ben-Zvi, Bellevue, WA (US); Ryan P. Puffer, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 15/499,593

(22) Filed: Apr. 27, 2017

(65) Prior Publication Data

US 2018/0314827 A1 Nov. 1, 2018

(51) Int. Cl.
*G06F 9/00* (2006.01)
*G06F 21/57* (2013.01)
*G06F 12/0802* (2016.01)
*G06F 21/53* (2013.01)
*G06F 21/44* (2013.01)
(Continued)

(52) U.S. Cl.
CPC .......... *G06F 21/575* (2013.01); *G06F 9/4401* (2013.01); *G06F 9/45558* (2013.01); *G06F 12/0802* (2013.01); *G06F 21/44* (2013.01); *G06F 21/53* (2013.01); *H04L 9/0897* (2013.01); *G06F 2009/45575* (2013.01); *G06F 2009/45587* (2013.01); *G06F 2212/152* (2013.01); *G06F 2212/60* (2013.01); *G06F 2221/034* (2013.01); *G06F 2221/2107* (2013.01)

(58) Field of Classification Search
CPC .. G06F 21/575; G06F 9/4401; G06F 9/45558; G06F 12/0802; G06F 21/44; G06F 21/53; H04L 9/0897
USPC .............................. 713/1, 2, 189, 165; 718/1
See application file for complete search history.

(56) References Cited

U.S. PATENT DOCUMENTS 8,065,713 B1 11/2011 Vainstein et al.
9,003,478 B2 * 4/2015 Kavantzas .............. H04L 63/10
713/1

(Continued)

OTHER PUBLICATIONS

Nemnom, Charbel, "What is Key Storage Drive in Windows Server 2016 Hyper-V?", https://www.starwindsoftware.com/blog/what-is-key-storage-drive-in-windows-server-2016-hyper-v, Published on: Oct. 13, 2016, 8 pages.

*Primary Examiner* — Aurel Prifti

(57) ABSTRACT

A device runs a hypervisor and a virtual machine. The virtual machine includes a virtual security module, which can be a virtual trusted platform module (TPM). The virtual security module for the virtual machine is encrypted, and in order for the hypervisor to run the virtual machine the virtual security module is decrypted using a security module key. If a host guardian service is accessible, then the hypervisor obtains the key to decrypt the virtual security module from the host guardian service. However, if the host guardian service is inaccessible, then the hypervisor uses a key securely stored in a key cache of the device to decrypt the virtual security module. In one or more embodiments, the hypervisor can obtain the key from the key cache only if a health certificate indicating that the host guardian service trusts the device has been previously obtained from the host guardian service.

19 Claims, 8 Drawing Sheets

(51) Int. Cl.
    *G06F 9/455*    (2018.01)
    *G06F 9/4401*    (2018.01)
    *H04L 9/08*    (2006.01)

(56) References Cited

U.S. PATENT DOCUMENTS

| | | |
|---|---|---|
| 9,116,735 B2 | 8/2015 | Srinivasan et al. |
| 9,361,462 B2 | 6/2016 | Chen et al. |
| 2006/0126836 A1 | 6/2006 | Rivas |
| 2007/0094719 A1 | 4/2007 | Scarlata |
| 2008/0065882 A1* | 3/2008 | Goodman ............ G06F 21/6218 713/165 |
| 2011/0202916 A1 | 8/2011 | Voba et al. |
| 2011/0296201 A1 | 12/2011 | Monclus et al. |
| 2011/0302400 A1* | 12/2011 | Maino ................... G06F 21/575 713/2 |
| 2013/0003969 A1 | 1/2013 | Farrugia et al. |
| 2014/0007087 A1* | 1/2014 | Scott-Nash ............. G06F 21/53 718/1 |
| 2014/0032920 A1 | 1/2014 | Gehrmann et al. |
| 2015/0026682 A1 | 1/2015 | Singh et al. |
| 2015/0318986 A1* | 11/2015 | Novak ................. H04L 9/0894 713/189 |
| 2015/0319160 A1 | 11/2015 | Ferguson et al. |
| 2017/0353319 A1* | 12/2017 | Scarlata ................. G06F 21/53 |
| 2018/0241572 A1* | 8/2018 | Miele ................... H04L 9/3236 |
| 2019/0020647 A1* | 1/2019 | Sinha ................. H04L 63/0435 |

* cited by examiner

ENABLING OFFLINE RESTART OF SHIELDED VIRTUAL MACHINES USING KEY CACHING

BACKGROUND

As computing technology has advanced, computing devices have become increasingly commonplace in our lives. Situations oftentimes arise in which people desire to keep some information on or available to their computing devices private, such as pictures or documents stored on their devices, communications with other computing devices or services, and so forth. Unfortunately, computing devices can be susceptible to attack from malicious users, malicious programs, and so forth, and if such an attack is successful information that a user desires to keep private can be revealed to others. Maintaining usability of computing devices in a wide range of environments and situations, while still protecting such computing devices from such attacks, remains difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first key and a second key are received from a remote host guardian service. The first key is used to decrypt an encrypted virtual security module for a virtual machine on the computing device and the second key is used to re-encrypt the virtual security module. The virtual security module is re-encrypted using the second key and the re-encrypted virtual security module is stored at the computing device. The second key is stored in a key cache of the computing device. Upon subsequently attempting to restart the virtual machine, in response to the remote host guardian service being inaccessible, the second key from the key cache is used to decrypt the re-encrypted virtual security module and the virtual machine is allowed to run using the virtual security module.

In accordance with one or more aspects, a request for a health certificate is receive from a computing device, the request including a health measurement of the computing device. The health measurement is analyzed to determine whether the computing device can be trusted, and the health certificate is returned to the computing device in response to determining that the computing device can be trusted. Subsequently, a decryption request is received, from the computing device, the decryption request including the health certificate and a key protector. A determination is made as to whether the received health certificate is valid for the computing device. In response to determining that the received health certificate is valid for the computing device, an ingress key and an egress key are returned, the ingress key being an encrypted key extracted from the key protector by decrypting the key protector, and the egress key comprising a rolled key to replace the ingress key.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
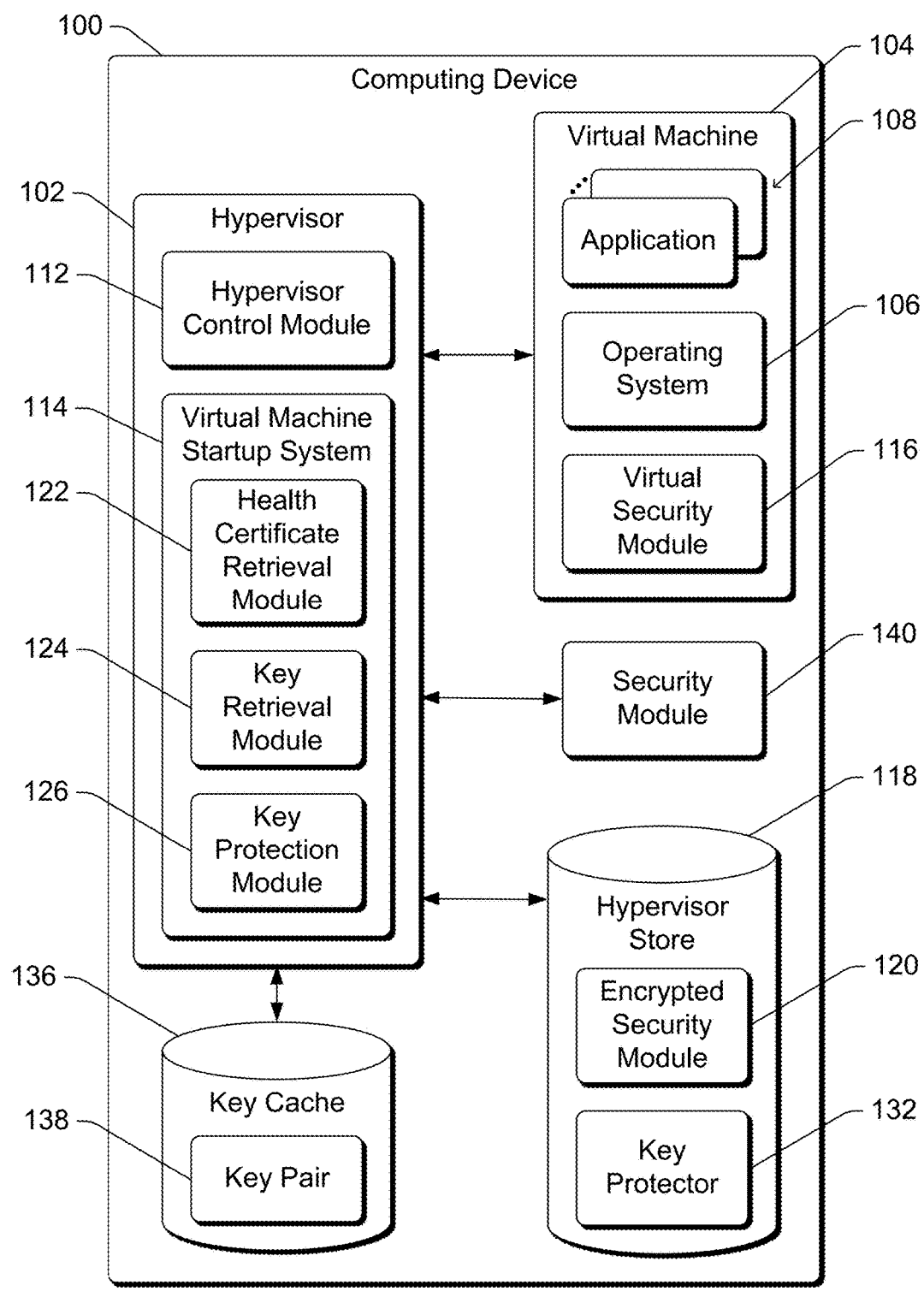
FIG. 1 is a block diagram illustrating an example computing device implementing the enabling offline restart of shielded virtual machines using key caching in accordance with one or more embodiments.

Enabling offline restart of shielded virtual machines using key caching is discussed herein. A computing device runs a virtual machine manager (also referred to as a hypervisor) and one or more virtual machines. Each virtual machine includes a virtual security module, which in one or more embodiments is a virtual trusted platform module (TPM). The virtual security module for a virtual machine provides security functionality for the virtual machine, such as secure data storage, cryptographic operations, and so forth. The virtual security module for a virtual machine is encrypted, and in order for the virtual machine manager to run the virtual machine the virtual security module is decrypted using a particular key, referred to herein as a security module key. An encrypted version of the security module key is stored on the computing device, and the computing device has this encrypted version decrypted, and in turn uses the decrypted security module key to decrypt the virtual security module. The virtual machine cannot be run without the virtual security module being decrypted, and accordingly the virtual machine is also referred to as a shielded virtual machine.

The computing device communicates with a remote host guardian service to obtain a health certificate for the computing device. The health certificate indicates that the computing device is the device it claims to be, and certifies that the computing device was booted into (and is thus presumably still running in) a secure or trusted mode. The computing device provides a record of modules or components running on the computing device (e.g., a set of cryptographic hash values or measurements representing the modules or components that were loaded and run as part of booting an operating system and/or hypervisor on the computing device). The host guardian service evaluates the record of modules or components provided by the computing device and determines whether the computing device can be trusted. If the computing device can be trusted then the host guardian service issues the health certificate; if the computing device cannot be trusted then the host guardian service does not issue the health certificate.

When the computing device is online (the host guardian service is accessible), to have the encrypted security module key decrypted the computing device sends a request to the host guardian service to decrypt the security module key, providing to the host guardian service the encrypted security module key and the health certificate to the host guardian service. If no health certificate was received from the host guardian service, or if the health certificate is no longer valid (e.g., has expired or has been tampered with), then the request will be denied by the host guardian service. If the health certificate is still valid (e.g., has not expired and has not been tampered with), then the host guardian service decrypts the security module key and securely returns the decrypted key to the computing device.

The host guardian service returns the decrypted security module key to the computing device securely as part of two key pairs. A key pair can be securely returned by, for example, encrypting the key pair in a manner that allows the computing device but not other devices to decrypt the key pair. One key pair is an ingress key and an egress key, the other key pair is two copies of the egress key. The ingress key is the decrypted security module key, and the egress key is a new key (a rolled key) that replaces the ingress key. The computing device decrypts the virtual security module using the ingress key. The computing device also re-encrypts the virtual security module using the egress key and stores the encrypted virtual security module. The egress key is the new security module key for the virtual security module, so the computing device also stores the egress key in a manner that allows the host guardian service but not other devices or services to decrypt the egress key. The next time the computing device sends a request to the host guardian service to decrypt the security module key, the encrypted egress key is sent as the encrypted security module key. The second key pair, which includes two copies of the egress key, is encrypted and stored in a key cache of the computing device so that the virtual machine manager can decrypt the second key pair but other devices cannot.

If the computing device desires to re-start the virtual machine at a later time, a request to the host guardian service to decrypt the security module key is again sent. In some situations, the host guardian service may not be available (e.g., there may be a network communication issue, network access on the computing device may be disabled, etc.). In such situations, the computing device is referred to as offline and the virtual machine manager decrypts the second key pair (the two copies of the egress key) in the key cache, and uses the egress key to decrypt the virtual security module. For example, the virtual machine manager decrypts the virtual security module using one copy of the egress key (which is the current security module key), and re-encrypts the virtual security module using the egress key and stores the encrypted virtual security module. This is similar to the process of obtaining the ingress and egress keys from the host guardian service, but the host guardian service need not be accessed and the ingress key is not rolled. Thus, even though the host guardian service is not available, the computing device can decrypt and virtual security module and thus run the shielded virtual machine.

The techniques discussed herein thus provide the security of a shielded virtual machine, typically allowing the shielded virtual machine to be run only if the host guardian service returns the key used to decrypt the virtual security module used by the shielded virtual machine. However, the techniques discussed herein further allow for the flexibility for the shielded virtual machine to run even if computing device is offline (the host guardian service is not accessible), thereby improving usability of the computing device. The ability to run the shielded virtual machine when the host guardian service is not accessible can be restricted based on various conditions, such as a health certificate having been previously issued by the host guardian service for the computing device, the health certificate not expiring, the record of modules or components running on the computing device (e.g., a set of cryptographic hash values or measurements representing the modules or components that were loaded and run as part of booting an operating system on the computing device) being the same as were running when the health certificate was provided by the host guardian service, and so forth.

References are made herein to symmetric keys and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

FIG. 1 is a block diagram illustrating an example computing device 100 implementing the enabling offline restart of shielded virtual machines using key caching in accordance with one or more embodiments. The computing device 100 can be a variety of different types of devices. For example, the computing device 100 can be a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device 100 may range from a full-resource device with substantial memory and processor resources (e.g., personal computers, game consoles) to a low-resource device with limited memory and/or processing resources (e.g., traditional set-top boxes, hand-held game consoles).

The computing device 100 includes a hypervisor 102 and at least one virtual machine 104. The virtual machine 104 can also be referred to as a virtual machine (VM). The virtual machine 104 is a logical unit of isolation within which an operating system 106 and one or more applications 108 runs. Although a single virtual machine 104 is shown, multiple virtual machines can be run on the computing device 100 with the operating systems running within each virtual machine being isolated from each other. Similarly, the applications running within a virtual machine are isolated from applications running in other virtual machines. Different operating systems and/or applications can be run in different virtual machines. The operating system and applications running in one virtual machine are not able to access, and need not be aware of, the operating systems and applications running in other virtual machines.

The hypervisor 102 is a virtual machine manager that manages access to the functionality provided by components in the computing device 100. These components can be a variety of different physical components, such as processor components, input/output (I/O) components, and/or other components or devices. For example, the components can include one or more processors or processor cores, one or more memory components (e.g., volatile and/or nonvolatile memory), one or more storage devices (e.g., optical and/or magnetic disks, flash memory drives), one or more communication components (e.g., wired and/or wireless network adapters), combinations thereof, and so forth. These components are virtualized to the virtual machine 104, and access to these components is managed by the hypervisor 102.

The hypervisor 102 includes a hypervisor control module 112 and a virtual machine startup system 114. The hypervisor control module 112 manages the access to various physical components in the computing device 100 by the operating system 106. The virtual machine startup system 114 manages the startup of the virtual machine 104. The startup of the virtual machine 104 refers to loading the appropriate code for the virtual machine 104 into memory of the computing device 100 and beginning running the code.

The virtual machine 104 is also referred to as a shielded virtual machine. A shielded virtual machine is protected against unauthorized access or tampering by malicious programs, devices, or users. This protection is provided in part through certification of the health of the computing device running the virtual machine by a remote service, referred to herein as a host guardian service. The health of the computing device refers to whether the computing device can be trusted based at least in part on the components or modules running on the computing device (e.g., the modules or components that were loaded and run as part of booting an operating system on the computing device 100). If the host guardian service has not certified the health of the computing device 100, then the shielded virtual machine 104 is not run on the computing device 100.

The protection of the shielded virtual machine 104 against unauthorized access or tampering is further provided by the use of the virtual security module 116. The virtual security module 116 is a secure cryptoprocessor that secures the virtual machine 104 at least in part by integrating cryptographic keys and cryptographic operations into the virtual machine 104. Generally, the operating system 106 on the virtual machine 104 leverages the virtual security module 116 to determine whether to run and/or how to run (e.g., which components of the operating system 106 to run, which of multiple modes the operating system 106 is to run in, etc.). In one or more embodiments, the operating system 106 needs the virtual security module 116 to release a key that can be used to decrypt data on a storage device so that the operating system 106 can boot. If the virtual security module 116 is not present, or different values were measured by the virtual security module 116 during booting of the operating system 106, the operating system 106 determines how to proceed (e.g., terminate booting of the operating system 106 and running of the virtual machine 104, running the operating system 106 in a public non-secure mode, etc.).

The virtual security module behaves analogously to a physical security module (e.g., a hardware cryptoprocessor), except that the virtual security module operates for a virtual machine (e.g., virtual machine 104) whereas a physical security module operates for a physical computing device (e.g., computing device 100). In one or more embodiments, the virtual security module is a virtual trusted platform module (TPM) in accordance with the TPM 2.0 (Trusted Platform Module) Library Specification, October 2014.

The hypervisor 102 stores the virtual security module 116 on a hypervisor store 118 in encrypted form as an encrypted security module 120. The hypervisor store 118 can be any of a variety of storage devices, such as solid state memory (e.g., Flash memory), magnetic disk, optical disc, and so forth. Generally, if the health of the computing device 100 is certified, then the hypervisor 102 decrypts the encrypted security module 120 and uses the decrypted security module as the virtual security module 116. However, if the health of the computing device 100 is not certified, then the hypervisor 102 does not decrypt the encrypted security module 120 and the virtual security module 116 is not available to the virtual machine 104, in which case the virtual security module 104 cannot run.

The virtual machine startup system 114 includes a health certificate retrieval module 122, a key retrieval module 124, and a key protection module 126. The health certificate retrieval module 122 requests a health certificate for the computing device from the host guardian service. The health certificate is used to obtain a security module key from the host guardian service so that the virtual security module 116 can be used, as discussed in more detail below. The host guardian service is a remote service with which the computing device 100 can communicate over a variety of different data networks, such as the Internet, a local area network (LAN), a cellular or other phone network, an intranet, other public and/or proprietary networks, combinations thereof, and so forth.

As part of the request for a health certificate, the health certificate retrieval module 122 provides an indication of the modules or components loaded when booting the computing device 100. This indication is, for example, an indication of the modules or components loaded as part of the boot process up through loading and running of the hypervisor 102. This indication is also referred to herein as a health measurement of the computing device 100.

In one or more embodiments, the computing device is booted using a process referred to as secure and measured boot. The security module 140 can be, for example, a TPM in accordance with the TPM 2.0 Library Specification, October 2014. The computing device 100 boots into a first component (e.g., a firmware component, such as in accordance with the Unified Extensible Firmware Interface (UEFI) specification Version 2.6, January 2016) and a measurement of that first component is provided to the security module 140. The first component loads a second component, and provides a measurement of the second component to the security module 140. This loading process continues with each component loading another component, up to the loading of the hypervisor 102, and each component providing a measurement of the component it loads to the security module 140. These measurements are, for example, hash values of the components that are loaded. The security module 140 thus has a list or record of measurements of all the components that are loaded from the first component to the hypervisor 102 (e.g., including an operating system loader component, driver components, operating system kernel components, and so forth). The security module 140 maintains these measurements in PCRs of the security module 140, and the collection of measurements is also referred to as the trusted computing group (TCG) log. This TCG log is the indication of the modules or components loaded when booting the computing device 100.

Figure 2:
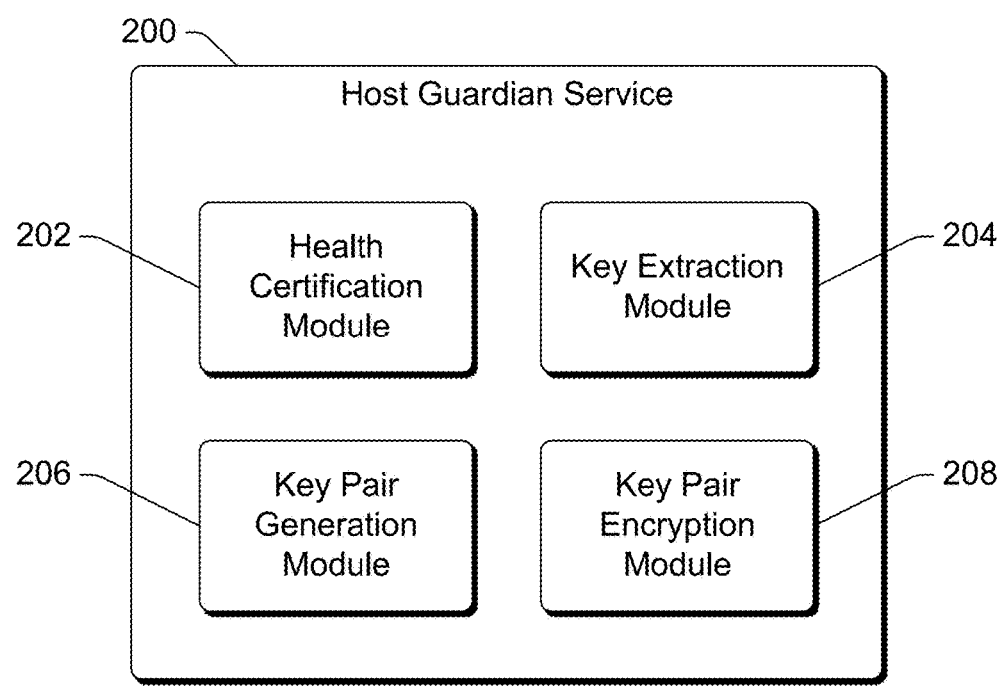
FIG. 2 illustrates an example host guardian service in accordance with one or more embodiments.

FIG. 2 illustrates an example host guardian service 200 in accordance with one or more embodiments. The host guardian service 200 includes a health certification module 202, a key extraction module 204, a key pair generation module 206, and a key pair encryption module 208. The health certification module 202 receives a health certificate request from a computing device, the health certificate request including or otherwise having associated therewith an indication of the modules or components loaded when booting the computing device. The health certification module 202 analyzes the indication of modules or components loaded when booting the computing device to determine whether the computing device can be trusted. Various other factors regarding the current state of the computing device can also be received along with the health certificate request and/or otherwise obtained by the health certification module 202 and used to determine whether the computing device can be trusted.

In one or more embodiments, the health certification module 202 maintains or otherwise has access to a whitelist that identifies one or more configurations of computing devices that are deemed trusted. These configurations are various combinations of modules or components loaded when booting the computing device. If the indication of the modules or components loaded when booting the computing device matches (is the same as) a configuration in the whitelist, then the health certification module 202 determines that the computing device can be trusted. However, if the indication of the modules or components loaded when booting the computing device does not match (is not the same as) a configuration in the whitelist, then the health certification module 202 determines that the computing device cannot be trusted. Additionally or alternatively, the health certification module 202 can use various other rules, criteria, or algorithms to determine, based at least in part on the indication of the modules or components loaded when booting the computing device, whether the computing device can be trusted.

If the health certification module 202 determines that the computing device can be trusted then the health certification module 202 generates a health certificate for the computing device and returns the health certificate to the computing device. The health certificate can be used by the computing device to obtain a security module key to allow a virtual security module on the computing device to be used, as discussed in more detail below. In one or more embodiments the health certificate generated by the health certification module 202 has an associated expiration time indicating how long the health certificate is valid (e.g., a particular number of hours, such as eight hours). Additionally, in one or more embodiments the health certificate is digitally signed by the host guardian service 200 (e.g., using a private key of a public/private key pair of the host guardian service 200), allowing the host guardian service 200 to later verify that the health certificate was indeed generated by the health certification module 202.

The host guardian service 200 also maintains an association between the computing device (from which the request for the health certificate was received) and the health certificate that was generated and returned by the host guardian service 200. This association allows the host guardian service 200 to determine whether a health certificate subsequently received from a computing device was generated for and returned to that computing device (rather than for another computing device). This association can be maintained in a variety of different manners, such as maintaining at the host guardian service a record of the computing device (e.g., an identifier of the computing device received from the computing device) with the health certificate, including an identifier of the computing device (e.g., received from the computing device) in the health certificate, and so forth.

If the health certification module 202 determines that the computing device cannot be trusted then the health certification module 202 does not generate and return a health certificate to the computing device. The health certification module 202 can optionally return to the computing device an indication of denial of the request for the health certificate.

Returning to FIG. 1, the encrypted security module 120 is a version of the virtual security module 116 that has been encrypted using a key (e.g., a symmetric key), and the key is also stored in the hypervisor store 118 as key protector 132. The key protector 132 is an encrypted version of the key used to decrypt the encrypted security module 120, the key having been encrypted as key protector 132 so that only the host guardian service can decrypt the key protector 132. The key can be encrypted to generate the key protector 132 so that only the host guardian service can decrypt the key protector in a variety of different manners, such as being encrypted by the host guardian service using a symmetric key known only to the host guardian service, using a public key of a public/private key pair of the host guardian service, and so forth.

In order to decrypt the key protector 132, the key retrieval module 124 sends a decryption request to the host guardian service. The decryption request includes the key protector 132 and the health certificate that was previously issued by the host guardian service. Alternatively, rather than previously receiving a health certificate, the decryption request can include a request for a health certificate.

The key extraction module 204 of FIG. 2 analyzes the health certificate received from the computing device to verify the health certificate has not been tampered with. This verification can be performed in various manners. For example, the health certificate can have been digitally signed by the host guardian service 200 as discussed above, and this digital signature can be provide to the key extraction module 204 along with the health certificate. The key extraction module 204 can verify this digital signature to verify the health certificate. Furthermore, the key extraction module 204 can verify that the health certificate is received from the computing device for which the health certificate was previously generated and to which the health certificate was previously returned. The key extraction module 204 can perform this verification using the association that is maintained between the health certificate and the computing device (from which the request for the health certificate was received) as discussed above.

If the health certificate has been tampered with and/or is not received from the computing device for which the health certificate was previously generated and to which the health certificate was previously returned, then the key extraction module 204 does not extract the security module key from the key protector. However, if the health certificate has not been tampered with and is received from the computing device for which the health certificate was previously generated and to which the health certificate was previously returned, then the key extraction module 204 does extract the security module key from the key protector. The key extraction module 204 extracts the security module key from the key protector by decrypting the key protector. As discussed above, the key protector was generated by encrypting the security module key in a manner that only the host guardian service can decrypt the key protector. Accordingly, the key extraction module 204 has an appropriate key to use to decrypt the key protector.

The key extraction module 204 returns the security module key (extracted from the key protector) to the computing device. In one or more embodiments the security module key is protected by being encrypted in a manner that allows the computing device to decrypt the security module key. This protection can be performed in different manners, such as using a public key of a public/private key pair of the computing device, using a symmetric key known to both the key extraction module 204 and the computing device, and so forth.

In one or more embodiments, the key extraction module 204 responds to the decryption request by extracting the security module key from the key protector and having the key pair generation module 206 generate two key pairs. The first of the two key pairs includes an ingress key and an egress key. The ingress key is the security module key extracted from the key protector by the key extraction module 204. The egress key is a newly generated key (e.g., generated by the key pair generation module 206). The egress key is also referred to as a rolled security module key, and is a new security module key that will replace the current security module key at the computing device. In one or more embodiments, the egress key is generated using perfect forward secrecy, which refers to generating an egress key such that any previously generated keys (e.g., the ingress key) cannot be generated based on the current key. Any of a variety of public and/or proprietary techniques can be used to generate the egress key using perfect forward secrecy.

The second of the two key pairs is two copies of the egress key. This egress key is the same egress key as is included in the first of the two key pairs. The second of the two key pairs is used to allow decryption of the virtual security module on the computing device in certain situations in which the host guardian service 200 is not available, as discussed in more detail below.

The key pair encryption module 208 encrypts the two key pairs in order to allow the two key pairs to be securely communicated to the computing device. The two key pairs can be encrypted in various manners, such as using a public key of a public/private key pair of the computing device, using a symmetric key known to both the key extraction module 204 and the computing device, and so forth.

The computing device sends the key protector 132 to the host guardian service to have the security module key extracted from the key protector 132. The first time the virtual machine 104 is run, an initial security module key and key protector 132 are generated. This initial security module key and key protector 132 can be generated in a variety of different manners. For example, the virtual machine startup system 114 can generate the initial security module key and encrypt the initial security module key to generate the key protector 132. By way of another example, the virtual machine startup system 114 can communicate a request to the host guardian service for the initial security module key, and encrypt and store the initial security module key as the key protector 132.

The key retrieval module 124 receives the security module key from the host guardian service. The host guardian service encrypted the security module key in a manner that allows the computing device 100 to decrypt the security module key, and the key retrieval module 124 decrypts the security module key. This decryption is, for example, decrypting the two key pairs returned by the host guardian service.

The key retrieval module 124 uses the security module key received from the host guardian service to decrypt the encrypted security module 120. The decrypted security module, which is virtual security module 116, is then available to the virtual machine 104 and the virtual machine 104 is able to run and use the virtual security module 116.

The key protection module 126 re-encrypts the virtual security module 116 using the egress key received from the host guardian service. The key protection module 126 stores the re-encrypted virtual security module 116 in the hypervisor store 118 as the encrypted security module 120. Thus, the encrypted security module 120 in the hypervisor store 118 is now encrypted with the egress key from the host guardian service rather than the ingress key, so the egress key effectively becomes the new security module key.

The key protection module 126 also stores a new key protector in the hypervisor store 118 so that only the host guardian service can decrypt the new key protector (e.g., the new key protector is encrypted using the public key of a public/private key pair of the host guardian service). The new key protector replaces the previous key protector in the hypervisor store 118, so the new key protector becomes the key protector 132. The new key protector is the encrypted egress key received from the host guardian service. Thus, the next time the key retrieval module 124 sends a decryption request to the host guardian service, the host guardian service returns as the security module key the egress key, which allows the virtual machine startup system 114 to decrypt the new encrypted security module 120.

The key protection module 126 also stores the second of the two key pairs in a key cache 136 as key pair 138. The key cache 136 can be any of a variety of different storage devices, such as solid state memory (e.g., Flash memory), magnetic disk, optical disc, and so forth. The key pair 138 is stored in a secure manner that is tied to the existing health measurement of the computing device 100.

In one or more embodiments, the key pair 138 is stored in a file in the key cache 136 with a file name that is generated from a hash value generated by hashing the first of the two key pairs. If the key pair 138 is desired (e.g., because the host guardian service is inaccessible), the file name for the key pair 138 in the key cache 136 can be readily identified by again generating a hash value by hashing the first of the two key pairs.

In one or more embodiments, the key pair 138 is encrypted by the key protection module 126 using a key (e.g., a symmetric key) that is stored in the security module 140. If the computing device 100 is re-booted and loads the same components or modules as were loaded when the key pair 138 was encrypted (e.g., the health measurement is the same), then the security module 140 will release this key and allow the key protection module 126 to decrypt the key pair 138. However, if the computing device 100 is re-boot and loads a different set of components or modules than were loaded when the key pair 138 was encrypted (e.g., the health measurement is not the same), then the security module 140 will not release this key and the key protection module 126 is not able to decrypt the key pair 138.

In some situations, the host guardian service is not accessible to the computing device 100 when the key retrieval module 124 sends a decryption request. The host guardian service may not be available for various reasons, such as a network connection being disabled or otherwise not available, a network card or adapter in the computing device 100 malfunctioning, and so forth. The host guardian service not being accessible is also referred to as the computing device being offline.

In such situations, the virtual machine startup system 114 can use the cached key pair 138 to decrypt the encrypted security module 120. If the host guardian service is not available, the key retrieval module 124 obtains the key pair 138 from the key cache 136 and decrypts the key pair 138 using the key stored in the security module 140. The key pair 138 includes two copies of the previously received egress key from the host guardian service. The key retrieval module 124 uses the egress key to decrypt the encrypted security module 120, which is virtual security module 116, so the virtual security module 116 is then available to the virtual machine 104 and the virtual machine 104 is able to run and use the virtual security module 116.

The key protection module 126 optionally re-encrypts the virtual security module using the egress key and stores the re-encrypted virtual security module as the encrypted security module 120, and generates a new key protector 132 using the egress key, analogous to the discussion above regarding the key pair that includes the ingress and egress keys received from the host guardian service. Alternatively, since the encrypted security module 120 will be re-encrypted using the same key as was previously used to encrypt the encrypted security module 120 (the egress key), and the key protector 132 will be an encryption of the same key as was previously encrypted in the key protector 132 (the egress key), the key protection module 126 need not re-encrypt the virtual security module using the egress key and need not generate a new key protector 132. Rather, the previously stored encrypted security module 120 and key protector 132 can remain stored on the hypervisor store 118 and need not be replaced.

Various different constraints can be placed on the ability of the virtual machine startup system 114 to use the cached key pair 138 to decrypt the encrypted security module 120. One such constraint is that the health measurement of the computing device 100 when the key pair 138 was encrypted is the same as the current health measurement of the computing device 100 as discussed above (if the two health measurements are not the same, the virtual machine startup system 114 will not have access to the key in the security module 140 in order to decrypt the key pair 138). For example, if there is a change in the components or modules loaded when booting the computing device 100 (e.g., swapping out code integrity policies, disabling secure boot, adding a kernel debugger, etc.), the health measurement will be different than when the key pair 138 was encrypted and the virtual machine startup system 114 will not be able to use the cached key pair 138 to decrypt the encrypted security module 120.

One or more other constraints can additionally or alternatively be placed on the ability of the virtual machine startup system 114 to use the cached key pair 138 to decrypt the encrypted security module 120. These constraints can optionally be included as part of a policy applied to the computing device 100. For example, the key pair 138 may have an associated time constraint indicating how long the key pair 138 is valid for. This can be a time duration since the key pair 138 was received from the host guardian service (e.g., a particular number of hours or days), or can be a timestamp (e.g., a particular date and/or time after which the key pair 138 is no longer valid). If the time constraint is not satisfied (e.g., the key pair is no longer valid), then the key protection module 126 does not decrypt the key pair 138.

Thus, the use of the key pair 138 allows a shielded virtual machine to be run even though access to the host guardian service is not available. The cached key pair 138 can be used to allow the shielded virtual machine to be run as long as the computing device 100 previously received a health certificate and a key used to decrypt the encrypted security module 120 from the host guardian service. The key pair 138, received as a result of an earlier successful health measurement, is securely cached and is used to extend usage of the decrypted key received from the host guardian service during a duration of time so that the shielded virtual machine can be run despite the host guardian service being inaccessible.

It should be noted that although reference is made herein to the computing device 100 receiving two key pairs from the host guardian service, the techniques discussed herein can be implemented in different manners. The ingress key and the egress key can be returned to the computing device 100 from the host guardian service in different manners, such as a single key pair (e.g., from which the key protection module 126 can generate a key pair to store as cached key pair 138), as two individual keys, and so forth.

Figure 3A:
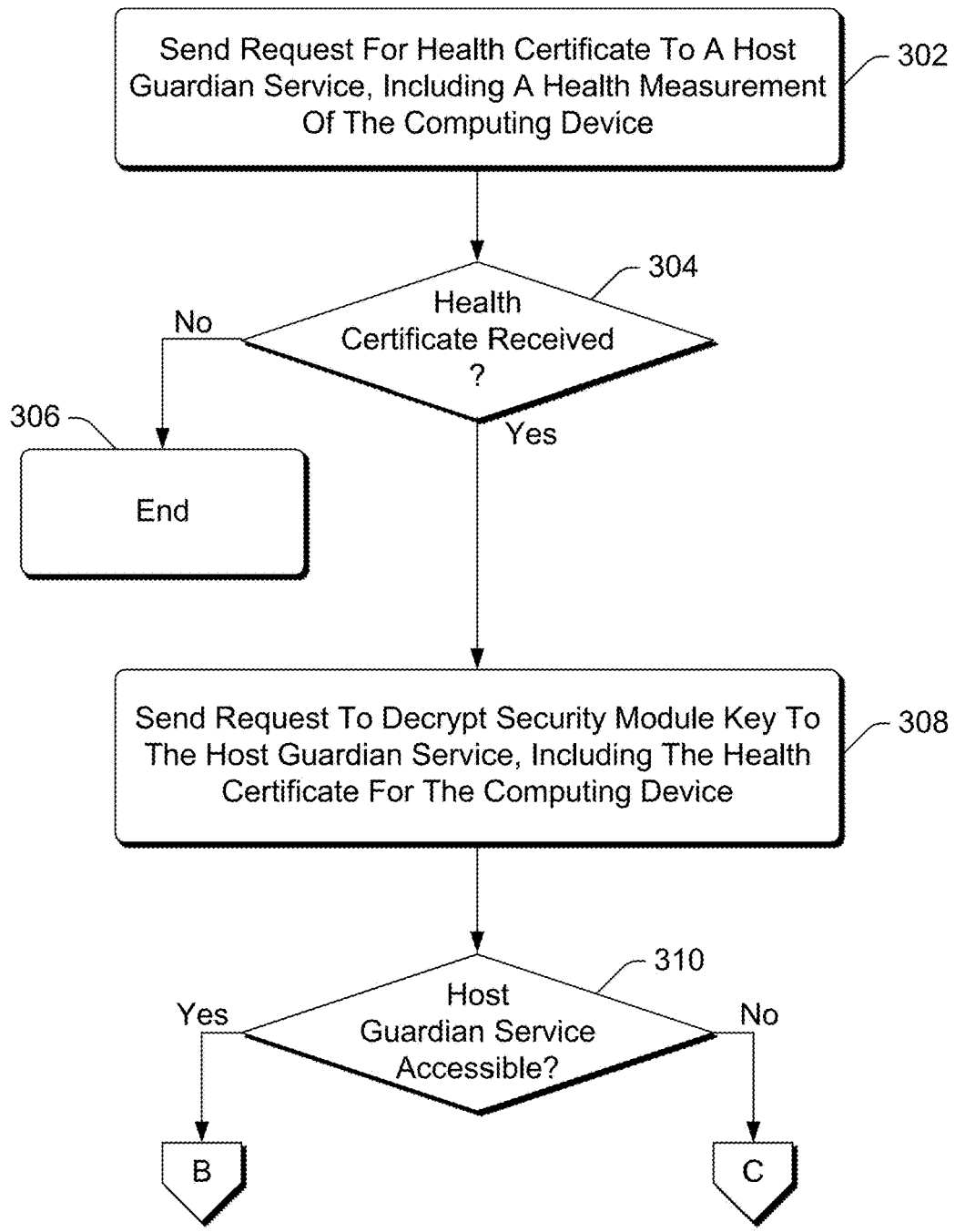
FIGS. 3A, 3B, and 3C are a flowchart illustrating an example process for enabling offline restart of shielded virtual machines using key caching in accordance with one or more embodiments.
Figure 3B:
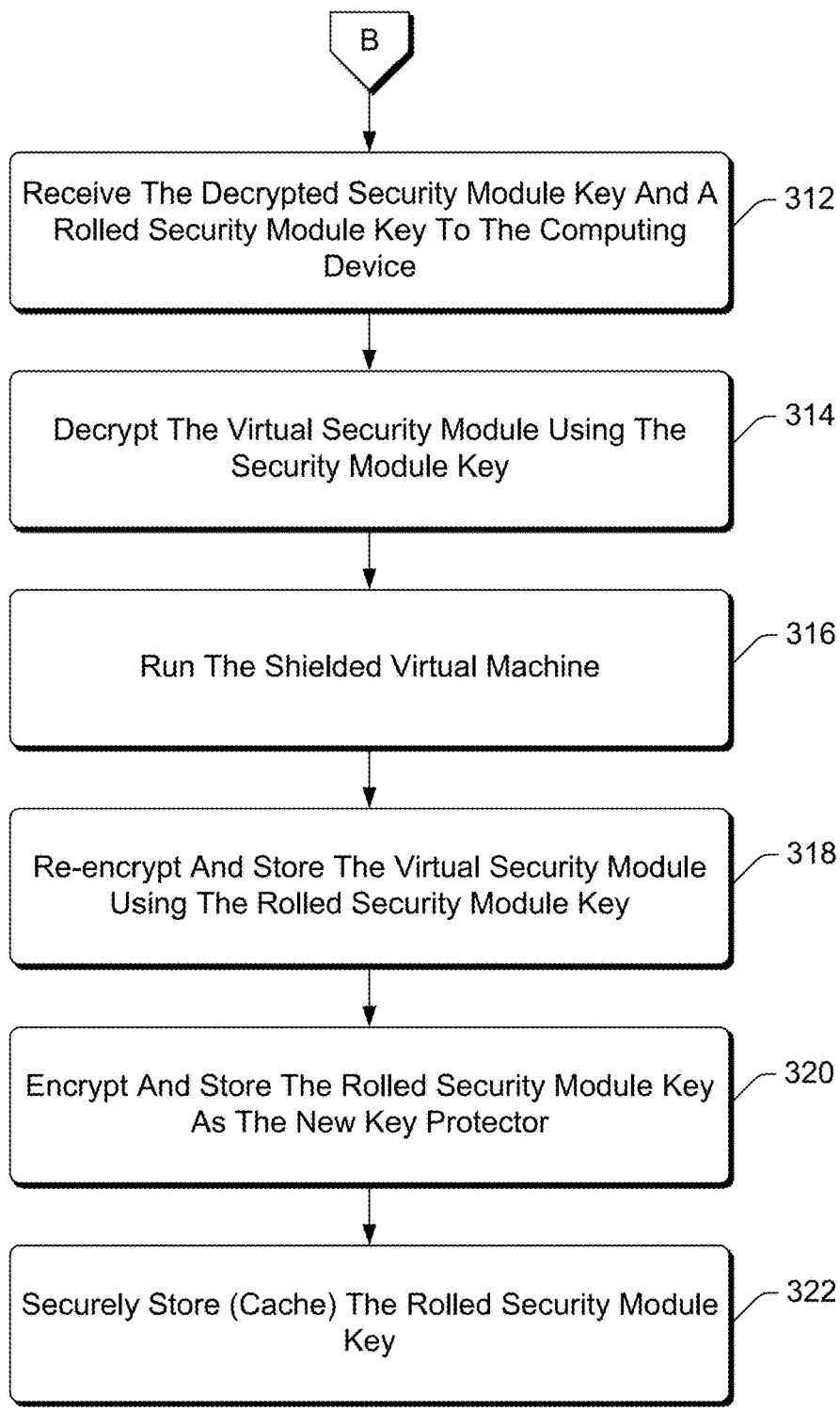
Figure 3C:
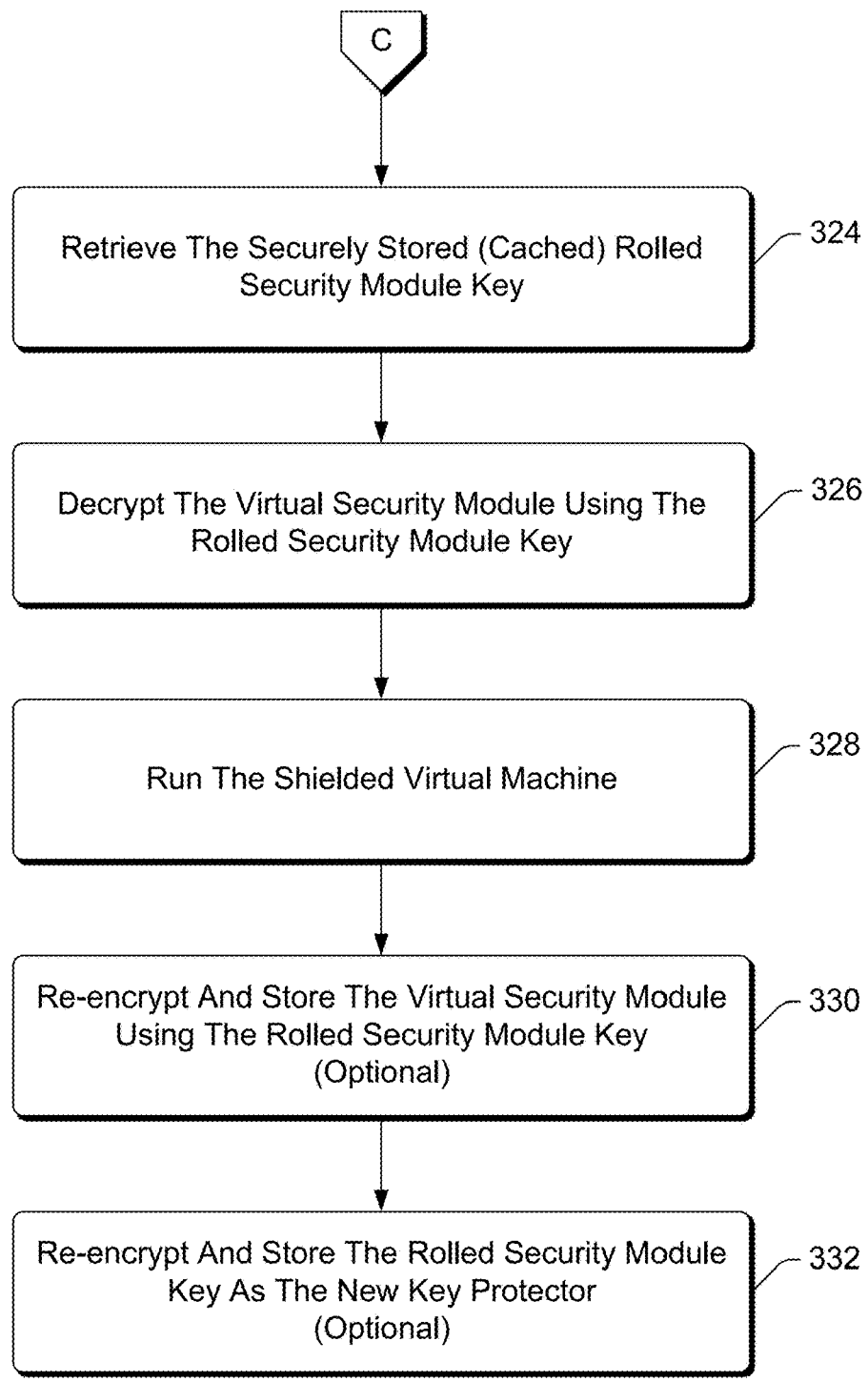

FIGS. 3A, 3B, and 3C are a flowchart illustrating an example process 300 for enabling offline restart of shielded virtual machines using key caching in accordance with one or more embodiments. Process 300 is carried out by a computing device, such as computing device 100 of FIG. 1, and can be implemented in software, firmware, hardware, or combinations thereof. Process 300 is shown as a set of acts and is not limited to the order shown for performing the operations of the various acts. Process 300 is an example process for enabling offline restart of shielded virtual machines using key caching; additional discussions of enabling offline restart of shielded virtual machines using key caching are included herein with reference to different figures.

In process 300, a request for a health certificate is sent to a host guardian service, the request including a health measurement of the computing device (act 302). The health measurement is an indication of the modules or components loaded as part of the boot process up through loading and running of the hypervisor as discussed above. The request for the health certificate can be sent at various times, such as the first time a virtual machine is to be run on the computing device, after a previously received health certificate has expired (e.g., based on the expiration time associated with the health certificate), and so forth.

Figure 4:
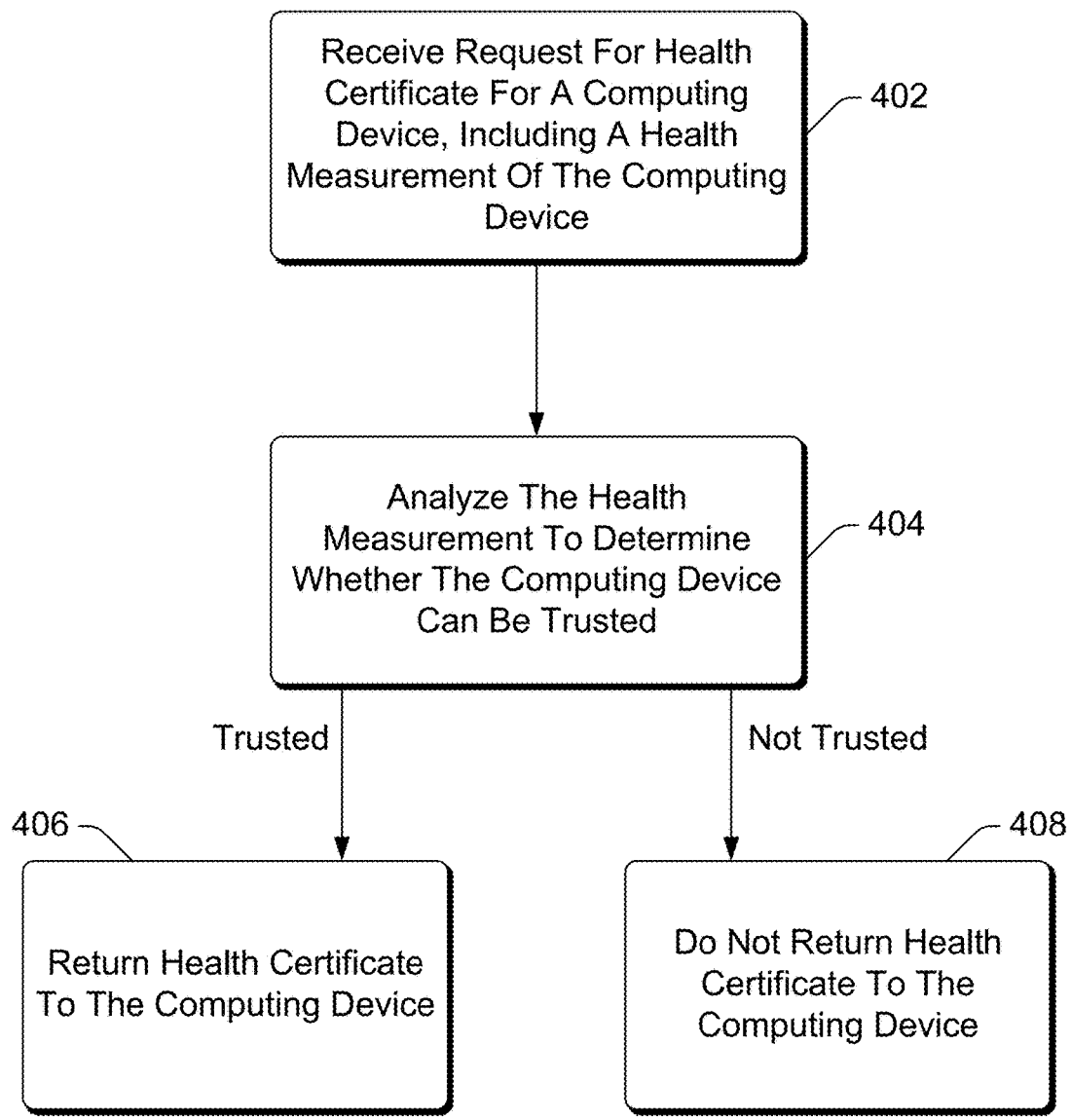
FIG. 4 is a flowchart illustrating an example process for evaluating a health certificate request in accordance with one or more embodiments.

FIG. 4 is a flowchart illustrating an example process 400 for evaluating a health certificate request in accordance with one or more embodiments. Process 400 is carried out by a host guardian service, such as host guardian service 200 of FIG. 2, and can be implemented in software, firmware, hardware, or combinations thereof. Process 400 is shown as a set of acts and is not limited to the order shown for performing the operations of the various acts. Process 400 is an example process for evaluating a health certificate request; additional discussions of evaluating a health certificate request are included herein with reference to different figures.

In process 400, a request for a health certificate is received for a computing device, the request including a health measurement of the computing device (act 402). The health measurement is an indication of the modules or components loaded as part of the boot process up through loading and running of the hypervisor on the computing device as discussed above.

The health measurement is analyzed to determine whether the computing device can be trusted (act 404). This analysis can be performed in a variety of different manners, such as by determining whether the health measurement is included on a whitelist (e.g., a list of approved health measurements). The computing device can be trusted if the health measurement is included on the whitelist, and otherwise cannot be trusted.

If the computing device can be trusted, then a health certificate is returned to the computing device (act 406). The health certificate is an indication to the computing device that the host guardian service has certified the health of the computing device 100. The health certificate has an associated expiration time as discussed above, and can be digitally signed by the host guardian service as discussed above.

However, if the computing device cannot be trusted, then a health certificate is not returned to the computing device (act 408). A denial response or other indication that a health certificate will not be provided to the computing device can optionally be returned to the computing device in act 408.

Returning to FIG. 3A, process 300 proceeds based on whether the health certificate is received from the host guardian service (act 304). If the health certificate is not received, then process 300 ends (act 306).

If the health certificate is received, then at some time the computing device sends a request to the host guardian service to decrypt the a security module key, the request including the health certificate for the computing device (act 308). The security module key is the key used to decrypt the encrypted security module on the computing device.

Process 300 proceeds based on whether the host guardian service is accessible (act 310). The host guardian service may not be accessible for various different reasons as discussed above, such as no network connection to the host guardian service, a malfunctioning network adapter or card on the computing device, and so forth.

If the host guardian service is accessible then the host guardian service receives the request.

Figure 5:
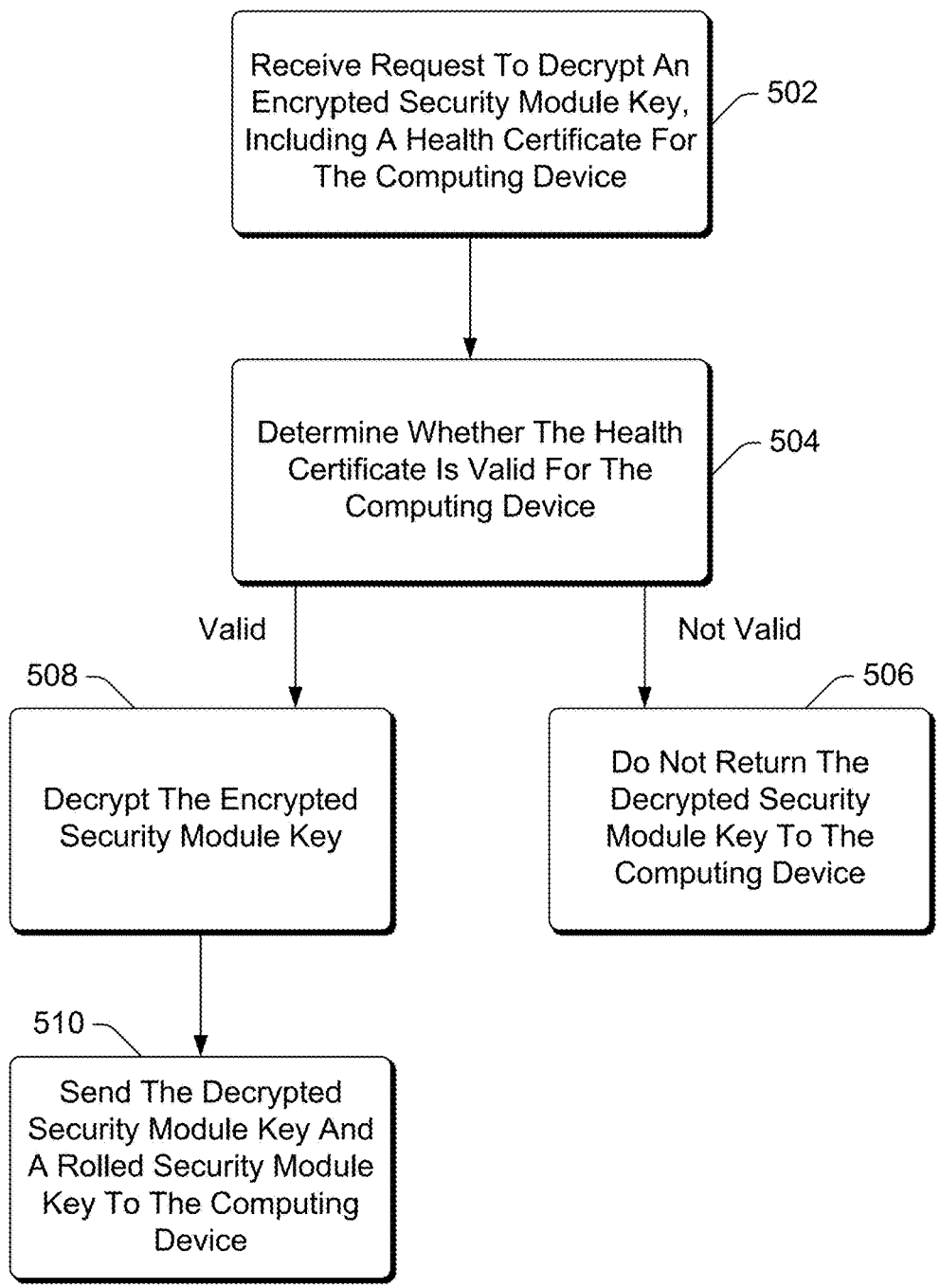
FIG. 5 is a flowchart illustrating an example process for evaluating a decryption request in accordance with one or more embodiments.

FIG. 5 is a flowchart illustrating an example process 500 for evaluating a decryption request in accordance with one or more embodiments. Process 500 is carried out by a host guardian service, such as host guardian service 200 of FIG. 2, and can be implemented in software, firmware, hardware, or combinations thereof. Process 500 is shown as a set of acts and is not limited to the order shown for performing the operations of the various acts. Process 500 is an example process for evaluating a decryption request; additional discussions of evaluating a decryption request are included herein with reference to different figures.

In process 500, a request to decrypt an encrypted security module key is received from a computing device, the request including a health certificate for the computing device (act 502).

A determination is made as to whether the health certificate is valid for the computing device (act 504). Various rules or criteria can be used to determine whether the health certificate is valid. In one or more embodiments, the health certificate is valid for the computing device if the computing device is the same computing device as the computing device to which the health certificate was previously issued, and if the health certificate has not been tampered with as discussed above.

If the health certificate is not valid for the computing device, then the decrypted security module key is not returned to the computing device (act 506). A denial response or other indication that the security module key will not be provided to the computing device can optionally be returned to the computing device in act 506.

However, if the health certificate is valid for the computing device, then the encrypted security module key is decrypted (act 508). The decrypted security module key as well as a rolled security module key is returned to the computing device (act 510). The rolled security module key is a new security module key to be used to encrypt the virtual security module as discussed above. The security module key is also referred to as the ingress key herein, and the rolled security module key is also referred to as the egress key herein. In one or more embodiments, the decrypted security module key and the rolled security module key are returned to the computing device as part of two key pairs as discussed above.

Returning to FIG. 3B, the decrypted security module key and the rolled security module key are received at the computing device (act 312). In one or more embodiments, these keys are received as part of two key pairs as discussed above. One key pair includes the decrypted security module key and the rolled security module key, and the other key pair includes two copies of the rolled security module key. Process 300 assumes that the health certificate sent to the host guardian service in act 308 is valid for the computing device. However, if the health certificate is not valid, then the computing device does not receive the decrypted security module key and the rolled security module key in act 312, and process 300 ends.

The virtual security module is decrypted using the received security module key (act 314). The shielded virtual machine is also allowed to run using the virtual security module (act 316).

The virtual security module is also re-encrypted using the rolled security module key (act 318). The re-encrypted virtual security module is stored in a hypervisor store, and the encrypted virtual security module that was previously stored in the hypervisor can be deleted from the hypervisor store.

The rolled security module key is also encrypted so that it can be decrypted by the host guardian service (act 320). This encryption can be performed in various manners as discussed above, such as using a public key of a public/private key pair of the host guardian service. The encrypted rolled security module key is stored in a hypervisor store as the new key protector, and the key protector that was previously stored in the hypervisor can be deleted from the hypervisor store The rolled security module key is also securely stored in a key cache (act 322). The rolled security module key is stored in the key cache so that it can be used to decrypt the virtual security module if the host guardian service is inaccessible at a later time as discussed above.

Returning to act 310, if the host guardian service is not accessible (the computing device is offline) then the securely stored rolled security module key is retrieved from the key cache of the computing device (act 324). Various constraints can be imposed on retrieving the rolled security module key from the key cache as discussed above, such as the health measurement of the computing device being the same as it was when the rolled security module key was stored in the key cache.

The virtual security module is decrypted using the security module key retrieved from the key cache (act 326). The shielded virtual machine is also allowed to run using the virtual security module (act 328).

The virtual security module is also optionally re-encrypted using the rolled security module key (act 330). The re-encrypted virtual security module is stored in a hypervisor store, and the encrypted virtual security module that was previously stored in the hypervisor can be deleted from the hypervisor store. It should be noted that act 330 is optional because the virtual security module is already stored in the hypervisor store encrypted using the rolled security module key, so it need not be re-encrypted with the rolled security module key and stored again in the hypervisor store.

The rolled security module key is also optionally re-encrypted and stored as the new key protector (act 332). This encryption can be performed in various manners as discussed above so that the key protector can be decrypted by the host guardian service, such as using a public key of a public/private key pair of the host guardian service. The encrypted rolled security module key is stored in a hypervisor store as the new key protector, and the key protector that was previously stored in the hypervisor can be deleted from the hypervisor store. It should be noted that act 332 is optional because the key protector is already stored in the hypervisor store encrypted using the rolled security module key, so it need not be re-encrypted with the rolled security module key and stored again in the hypervisor store.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
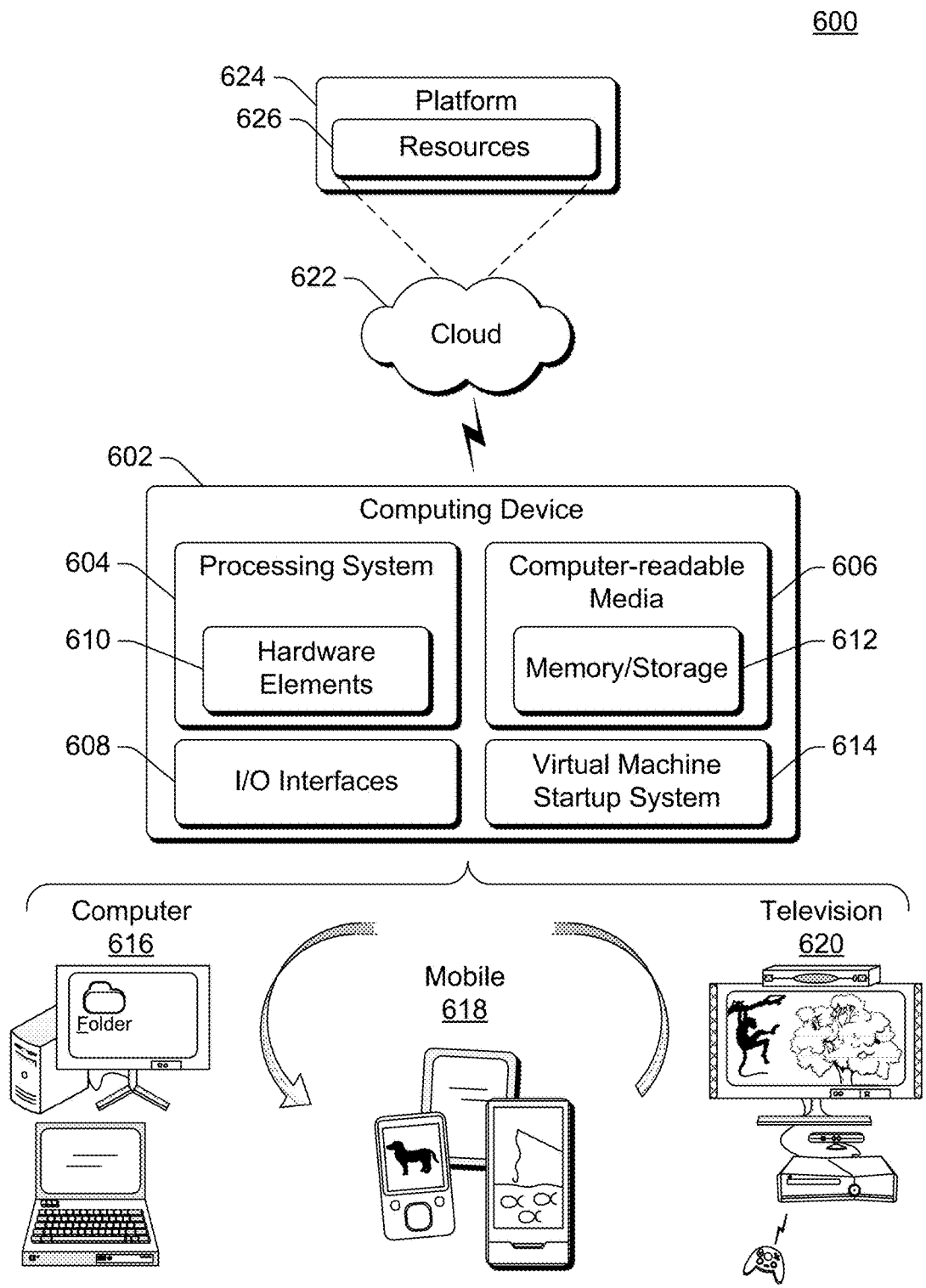
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a virtual machine startup system 614. The virtual machine startup system 614 provides various virtual machine functionality as discussed above, including enabling offline restart of shielded virtual machines using key caching. The virtual machine startup system 614 can implement, for example, the virtual machine startup system 114 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented on a computing device, the method comprising: receiving, from a remote host guardian service, a first key to decrypt an encrypted virtual security module for a virtual machine on the computing device and a second key to re-encrypt the virtual security module; re-encrypting the virtual security module using the second key; storing the re-encrypted virtual security module at the computing device; storing the second key in a key cache of the computing device; upon subsequently attempting to restart the virtual machine, in response to the remote host guardian service being inaccessible, using the second key from the key cache to decrypt the re-encrypted virtual security module; and allowing the virtual machine to run using the virtual security module.

Alternatively or in addition to any of the above described methods, any one or combination of: the receiving comprising receiving from the host guardian service a first key pair and a second key pair, the first key pair including the first key and the second key, the second key pair including two copies of the second key, and the storing the second key comprising storing the second key pair in the key cache; using the second key to decrypt the re-encrypted virtual security module only if a time constraint associated with the second key stored in the key cache is satisfied; using the second key only if a health measurement of the computing device is the same as a health measurement of the computing device at the time the second key was stored in the key cache; the method further comprising encrypting the second key with an additional key, and the storing the second key comprising storing the encrypted second key, storing the additional key in a security module of the computing device, and the security module of the computing device allowing subsequent access to the additional key only if the health measurement of the computing device is the same as the health measurement of the computing device at the time the additional key was stored in the security module; the method further comprising sending a request for a health certificate to the host guardian service, the request including a health measurement of the computing device, receiving the health certificate from the host guardian service only in response to the host guardian service determining that the health measurement of the computing device indicates that the computing device can be trusted, sending a decryption request to the host guardian service, the decryption request including the health certificate and the first key encrypted in a manner that allows the host guardian service to decrypt the first key, and the receiving the first key and the second key comprising receiving the first key and the second key from the host guardian service in response to the decryption request only after the host guardian service validates the health certificate; the second key becoming a new first key, and the method further comprising upon subsequently attempting an additional restart of the virtual machine, in response to the remote guardian service being accessible, receiving from the host guardian service the new first key and a new second key, allowing the virtual machine to run using the virtual security module, re-encrypting the virtual security module using the new second key, storing, at the computing device, the virtual security module re-encrypted with the new second key, and storing the new second key in the key cache of the computing device; the receiving the new first key and the new second key comprising receiving from the host guardian service a new first key pair and a new second key pair, the new first key pair including the new first key and the new second key, the new second key pair including two copies of the new second key, and the storing the new second key comprising storing the new second key pair in the key cache; the receiving the new first key comprising sending an additional decryption request to the host guardian service, the additional decryption request including the health certificate and the new first key encrypted in a manner that allows the host guardian service to decrypt the new first key, and receiving the new first key from the host guardian service in response to the additional decryption request only after host guardian service validates the health certificate.

A method implemented on a service, the method comprising: receiving, from a computing device, a request for a health certificate the request including a health measurement of the computing device; analyzing the health measurement to determine whether the computing device can be trusted; returning the health certificate to the computing device in response to determining that the computing device can be trusted; subsequently receiving, from the computing device, a decryption request, the decryption request including the health certificate and a key protector; determining whether the received health certificate is valid for the computing device; and returning, in response to determining that the received health certificate is valid for the computing device, an ingress key and an egress key, the ingress key being an encrypted key extracted from the key protector by decrypting the key protector, the egress key comprising a rolled key generated by the service to replace the ingress key.

Alternatively or in addition to any of the above described methods, any one or combination of: the returning comprising returning a first key pair and a second key pair, the first key pair including the ingress key and the egress key, the second key pair including two copies of the egress key; the determining whether the received health certificate is valid for the computing device comprising determining whether the received health certificate is the same health certificate as was returned to the computing device by the host guardian service and the received health certificate has not been tampered with.

A computing device comprising: one or more processors; a key cache; and a computer-readable storage medium having stored thereon multiple instructions of a hypervisor that, responsive to execution by the one or more processors, cause the one or more processors to: receive, from a remote host guardian service, a first key to decrypt an encrypted virtual security module for a virtual machine on the computing device and a second key to re-encrypt the virtual security module; re-encrypt the virtual security module using the second key; store the re-encrypted virtual security module at the computing device; store the second key in the key cache; upon subsequently attempting to restart the virtual machine, in response to the remote host guardian service being inaccessible, use the second key from the key cache to decrypt the re-encrypted virtual security module; and allow the virtual machine to run using the virtual security module.

Alternatively or in addition to any of the above described computing devices, any one or combination of: wherein to receive the first key is to receive from the host guardian service a first key pair and a second key pair, the first key pair including the first key and the second key, the second key pair including two copies of the second key, and wherein to store the second key is to store the second key pair in the key cache; wherein to use the second key to decrypt the re-encrypted virtual security module is to use the second key to decrypt the re-encrypted virtual security module only if a time constraint associated with the second key stored in the key cache is satisfied; wherein to use the second key to decrypt the re-encrypted virtual security module is to use the second key to decrypt the re-encrypted virtual security module only if a health measurement of the computing device is the same as a health measurement of the computing device at the time the second key was stored in the key cache; the multiple instructions further causing the one or more processors to encrypt the second key with an additional key, and wherein to store the second key comprises to store the encrypted second key and store the additional key in a security module of the computing device, the security module of the computing device allowing subsequent access to the additional key only if the health measurement of the computing device is the same as the health measurement of the computing device at the time the additional key was stored in the security module; the multiple instructions further causing the one or more processors to send a request for a health certificate to the host guardian service, the request including a health measurement of the computing device, receive the health certificate from the host guardian service only in response to the host guardian service determining that the health measurement of the computing device indicates that the computing device can be trusted, send a decryption request to the host guardian service, the decryption request including the health certificate and the first key encrypted in a manner that allows the host guardian service to decrypt the first key, and receive the first key and the second key from the host guardian service in response to the decryption request only after the host guardian service validates the health certificate; the second key becoming a new first key, the multiple instructions further causing the one or more processors to upon again subsequently attempting to restart the virtual machine, in response to the remote guardian service being accessible, receive from the host guardian service the new first key and a new second key, allow the virtual machine to run using the virtual security module, re-encrypt the virtual security module using the new second key, store, at the computing device, the virtual security module re-encrypted with the new second key, and store the new second key in the key cache of the computing device; wherein to receive the new first key and the new second key is to receive from the host guardian service a new first key pair and a new second key pair, the new first key pair including the new first key and the new second key, the new second key pair including two copies of the new second key, and wherein to store the new second key is to store the new second key pair in the key cache.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented on a computing device, the method comprising:
   receiving, from a remote host guardian service, a first key to decrypt an encrypted virtual security module for a virtual machine on the computing device and a second key to re-encrypt the virtual security module;
   re-encrypting the virtual security module using the second key;
   storing the re-encrypted virtual security module at the computing device;
   storing the second key in a key cache of the computing device;
   upon subsequently attempting to restart the virtual machine, in response to the remote host guardian service being inaccessible, using the second key from the key cache to decrypt the re-encrypted virtual security module; and
   allowing the virtual machine to run using the virtual security module.

2. The method as recited in claim 1, the receiving comprising receiving from the host guardian service a first key pair and a second key pair, the first key pair including the first key and the second key, the second key pair including two copies of the second key, and the storing the second key comprising storing the second key pair in the key cache.

3. The method as recited in claim 1, using the second key to decrypt the re-encrypted virtual security module only if a time constraint associated with the second key stored in the key cache is satisfied.

4. The method as recited in claim 1, using the second key only if a health measurement of the computing device is the same as a health measurement of the computing device at the time the second key was stored in the key cache.

5. The method as recited in claim 4, further comprising:
   encrypting the second key with an additional key, and the storing the second key comprising storing the encrypted second key;
   storing the additional key in a security module of the computing device; and
   the security module of the computing device allowing subsequent access to the additional key only if the health measurement of the computing device is the same as the health measurement of the computing device at the time the additional key was stored in the security module.

6. The method as recited in claim 1, further comprising:
   sending a request for a health certificate to the host guardian service, the request including a health measurement of the computing device;
   receiving the health certificate from the host guardian service only in response to the host guardian service determining that the health measurement of the computing device indicates that the computing device can be trusted;

sending a decryption request to the host guardian service, the decryption request including the health certificate and the first key encrypted in a manner that allows the host guardian service to decrypt the first key; and the receiving the first key and the second key comprising receiving the first key and the second key from the host guardian service in response to the decryption request only after the host guardian service validates the health certificate.

7. The method as recited in claim 6, the second key becoming a new first key, and the method further comprising:

upon subsequently attempting an additional restart of the virtual machine, in response to the remote guardian service being accessible, receiving from the host guardian service the new first key and a new second key;

allowing the virtual machine to run using the virtual security module;

re-encrypting the virtual security module using the new second key;

storing, at the computing device, the virtual security module re-encrypted with the new second key; and storing the new second key in the key cache of the computing device.

8. The method as recited in claim 7, the receiving the new first key and the new second key comprising receiving from the host guardian service a new first key pair and a new second key pair, the new first key pair including the new first key and the new second key, the new second key pair including two copies of the new second key, and the storing the new second key comprising storing the new second key pair in the key cache.

9. The method as recited in claim 7, the receiving the new first key comprising:

sending an additional decryption request to the host guardian service, the additional decryption request including the health certificate and the new first key encrypted in a manner that allows the host guardian service to decrypt the new first key; and receiving the new first key from the host guardian service in response to the additional decryption request only after host guardian service validates the health certificate.

10. A computing device comprising:
one or more processors;
a key cache; and
storage hardware having stored thereon multiple instructions of a hypervisor that, when executed by the one or more processors, cause the one or more processors to:
receive, from a remote host guardian service, a first key to decrypt an encrypted virtual security module for a virtual machine on the computing device and a second key to re-encrypt the virtual security module;
re-encrypt the virtual security module using the second key;
store the re-encrypted virtual security module at the computing device;
store the second key in the key cache;
upon subsequently attempting to restart the virtual machine, in response to the remote host guardian service being inaccessible, use the second key from the key cache to decrypt the re-encrypted virtual security module; and allow the virtual machine to run using the virtual security module.

11. The computing device as recited in claim 10, wherein to receive the first key is to receive from the host guardian service a first key pair and a second key pair, the first key pair including the first key and the second key, the second key pair including two copies of the second key, and wherein to store the second key is to store the second key pair in the key cache.

12. The computing device as recited in claim 10, wherein to use the second key to decrypt the re-encrypted virtual security module is to use the second key to decrypt the re-encrypted virtual security module only if a time constraint associated with the second key stored in the key cache is satisfied.

13. The computing device as recited in claim 10, wherein to use the second key to decrypt the re-encrypted virtual security module is to use the second key to decrypt the re-encrypted virtual security module only if a health measurement of the computing device is the same as a health measurement of the computing device at the time the second key was stored in the key cache.

14. The computing device as recited in claim 13, the multiple instructions further causing the one or more processors to encrypt the second key with an additional key, and wherein to store the second key comprises to store the encrypted second key and store the additional key in a security module of the computing device, the security module of the computing device allowing subsequent access to the additional key only if the health measurement of the computing device is the same as the health measurement of the computing device at the time the additional key was stored in the security module.

15. The computing device as recited in claim 10, the multiple instructions further causing the one or more processors to:

send a request for a health certificate to the host guardian service, the request including a health measurement of the computing device;

receive the health certificate from the host guardian service only in response to the host guardian service determining that the health measurement of the computing device indicates that the computing device can be trusted;

send a decryption request to the host guardian service, the decryption request including the health certificate and the first key encrypted in a manner that allows the host guardian service to decrypt the first key; and receive the first key and the second key from the host guardian service in response to the decryption request only after the host guardian service validates the health certificate.

16. The computing device as recited in claim 10, the second key becoming a new first key, the multiple instructions further causing the one or more processors to:

upon again subsequently attempting to restart the virtual machine, in response to the remote guardian service being accessible, receive from the host guardian service the new first key and a new second key;

allow the virtual machine to run using the virtual security module;

re-encrypt the virtual security module using the new second key;

store, at the computing device, the virtual security module re-encrypted with the new second key; and store the new second key in the key cache of the computing device.

17. The computing device as recited in claim 16, wherein to receive the new first key and the new second key is to receive from the host guardian service a new first key pair and a new second key pair, the new first key pair including the new first key and the new second key, the new second key pair including two copies of the new second key, and wherein to store the new second key is to store the new second key pair in the key cache.

18. Computer storage hardware storing instructions configured to, when executed by a computing device, cause the computing device to perform a process, the process comprising:

receiving, from a remote host guardian service, a first key to decrypt an encrypted virtual security module for a virtual machine on the computing device and a second key to re-encrypt the virtual security module;

re-encrypting the virtual security module using the second key;

storing the re-encrypted virtual security module at the computing device;

storing the second key in a key cache of the computing device;

upon subsequently attempting to restart the virtual machine, based on an indication that the remote host guardian service is inaccessible, using the second key from the key cache to decrypt the re-encrypted virtual security module; and allowing the virtual machine to run using the virtual security module.

19. Computer storage hardware according to claim 18, wherein the first key and the second key are provided based on presentation of a health certificate to the remote guardian service, the health certificate indicating that the computing device is the device it claims to be, and certifying that the computing device was booted into a secure or trusted mode.

* * * * *